(12) United States Patent
Locklair

(10) Patent No.: US 6,280,636 B1
(45) Date of Patent: Aug. 28, 2001

(54) ENHANCEMENT OF OXYGEN TRANSFER FROM DIFFUSED GAS AERATORS

(75) Inventor: Robert E. Locklair, Summerville, SC (US)

(73) Assignee: CHL LC, Summerville, SC (US)

( * ) Notice: Subject to any disclaimer, the term of this patent is extended or adjusted under 35 U.S.C. 154(b) by 0 days.

(21) Appl. No.: 09/493,557

(22) Filed: Jan. 28, 2000

Related U.S. Application Data

(60) Provisional application No. 60/117,730, filed on Jan. 29, 1999.

(51) Int. Cl.[7] .................................. C02F 1/74; C02F 7/00
(52) U.S. Cl. ............................ 210/747; 210/170; 261/77; 261/121.1; 261/124
(58) Field of Search ..................................... 210/620, 747, 210/758, 170, 220, 221.1, 221.2; 261/121.1, 124, 126, 77, DIG. 70, DIG. 71

(56) References Cited

U.S. PATENT DOCUMENTS

| 2,212,841 | * | 8/1940 | Maxwell . |
|---|---|---|---|
| 2,479,403 | * | 8/1949 | Powers . |
| 3,220,706 | * | 11/1965 | Valdespino . |
| 3,228,526 | * | 1/1966 | Ciabattari et al. . |
| 3,236,767 | * | 2/1966 | Ross et al. . |
| 3,271,304 | * | 9/1966 | Valdepino et al. . |
| 3,814,396 | * | 6/1974 | Di Gregorio et al. . |
| 4,279,742 | * | 7/1981 | Ivanov et al. . |
| 4,581,143 | * | 4/1986 | Pepper, III . |
| 4,595,296 | * | 6/1986 | Parks . |
| 4,629,559 | * | 12/1986 | Smith . |
| 4,663,046 | * | 5/1987 | Feldkirchner et al. . |
| 4,976,873 | * | 12/1990 | Ross . |

* cited by examiner

Primary Examiner—David A. Simmons
Assistant Examiner—Fred Prince
(74) Attorney, Agent, or Firm—Dority & Manning, PA

(57) ABSTRACT

A method and apparatus of increasing the oxygen transfer rate, residence time, and circulation pathways within waste water is provided. The process uses cyclic bursts of compressed air to establish flow patterns within waste water. The flow patterns increase the residence time of air supplied by conventional aeration sources. The increased aeration facilitates the treatment of the waste water. Additional benefits which result from the process include increased mixing of the waste water along with additional aeration brought about from the cyclic air bursts.

14 Claims, 7 Drawing Sheets

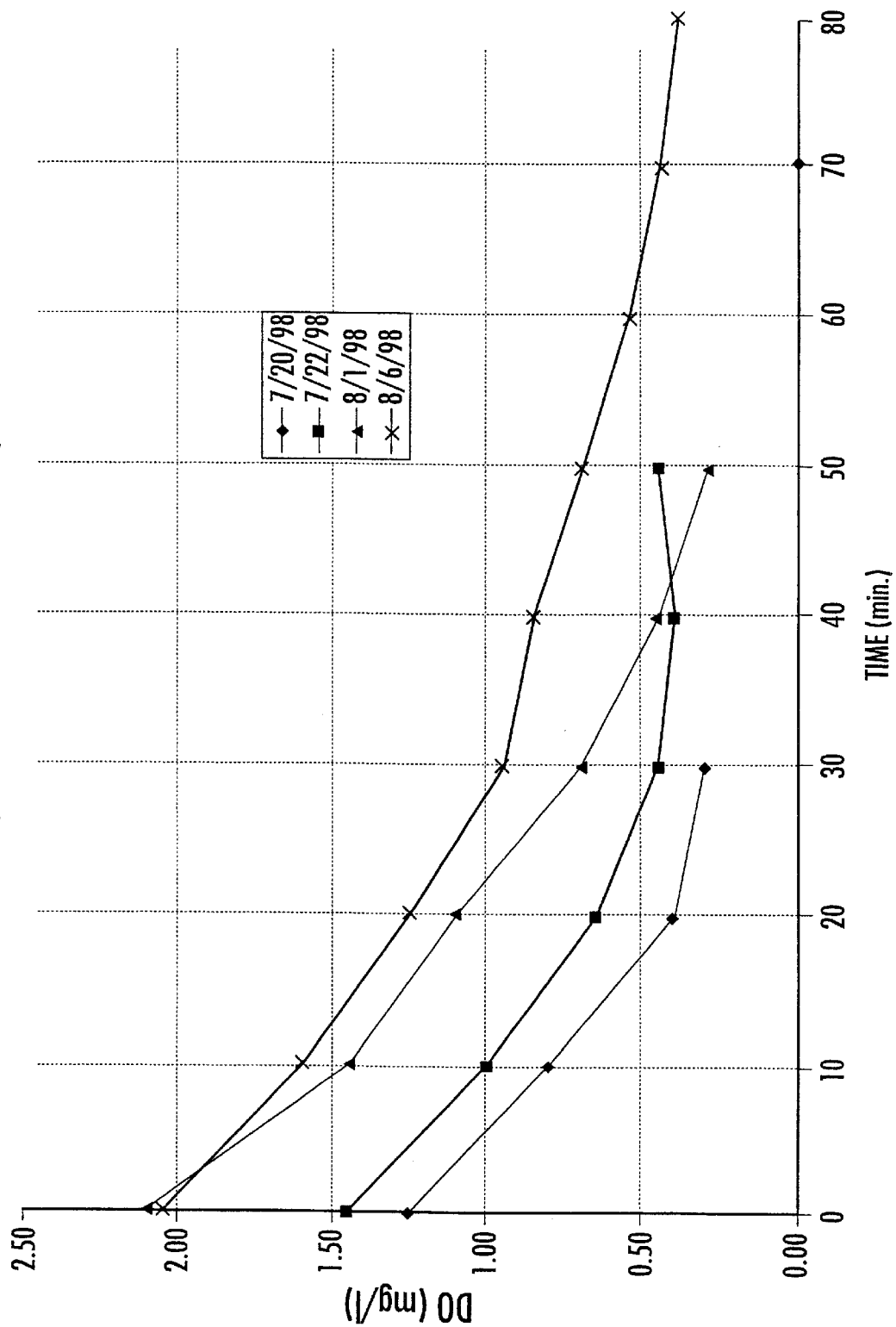

ENHANCEMENT OF OXYGEN TRANSFER FROM DIFFUSED GAS AERATORS

RELATED APPLICATIONS

This application claims the benefit of U.S. provisional Ser. No. 60/117,730 filed on Jan. 29, 1999 and incorporated herein by reference.

FIELD OF THE INVENTION

The present invention is a process and apparatus to enhance the oxygenation of liquids associated with sewage plants, waste treatment facilities and waste lagoon type environments.

BACKGROUND OF THE INVENTION

The use of aerators are widely used to enhance treatment operations of a sewage waste treatment facility. For example, surface aerators are often employed to treat the surface of a waste water lagoon or basin. Surface aeration does little to enhance the aeration at the lower levels of the lagoon or basin.

There are also a variety of fine bubble aeration devices in which compressed air is discharged at or near the bottom of a waste treatment basin or reservoir. The compressed air (or other gas) is passed through the small pores of a diffuser plate and released as a plurality of fine bubbles. The bubbles, rising to the surface, increase the aeration and dissolve oxygen content of the waste liquid. Frequently, mechanical stirrers are used in conjunction with aerators to increase the physical mixing of the biosolids and to better distribute the dissolved oxygen which results from the aeration equipment.

It is known in the art that the efficiency of aeration equipment for oxygen transfer in water is a function of the air bubble surface area and the time function of the air bubble surface area and the time of contact (residence time) between the bubble and the water. The size of air bubbles directly affects the surface area of the bubble. This particular parameter is controlled by the diffuser design. For any given volume of air, a plurality of small bubbles will provide a greater surface area than a single large bubble.

An additional parameter affecting the bubble size and surface area relates to the volume and flow rate of air. For a typical diffuser, it is a rather simple matter to calculate and determine the optimum air flow rate with a given diffuser which yields the greatest total surface area, and hence, aeration of the water. The residence time between the bubble and the water is also a function of both bubble size and the depth of submergence of the diffuser within the water. A smaller bubble will rise more slowly and increase the residence time. Conversely, a large bubble will rise more quickly but has a shorter residence time and a smaller surface area. In general, the majority of air injected into the water by the diffusers and aeration devices discussed above makes a single vertical pass through the water column before being released at the water's surface. Accordingly, there is room for improvement and variation within the art.

SUMMARY OF THE INVENTION

The present invention is directed to a way of increasing oxygen transfer by increasing the residence time by providing a strong vertical circulation pattern in the water which carries air bubbles from near the surface and down into a lower portion of the water column. As a result, the contact time between the bubbles and the liquid is increased. The increased residence time provides both a greater oxygenation to the water and may permit a more efficient and economical introduction of oxygen into a vessel or waste treatment facility.

A typical aeration diffuser provides a gentle vertical flow pattern of bubbles within a liquid. Typically, the liquid velocity resulting from airflow is no greater than the velocity of the individual rising air bubble. Given this relationship, the air bubble only stays in contact with the water for the time it takes the bubble to rise to the surface. The present invention provides a strong vertical flow pattern to the water which can be used to advantage to carry entrained bubbles within the water circulation pattern. This flow pattern significantly extends the contact time of the air bubbles with the water and therefore increases the efficiency of the aeration process.

BRIEF DESCRIPTION OF THE DRAWINGS

FIGS. 2 and 3 are graphs setting forth aeration data in accordance with the present invention;

DETAILED DESCRIPTION OF A PREFERRED EMBODIMENT

Figure 1A:
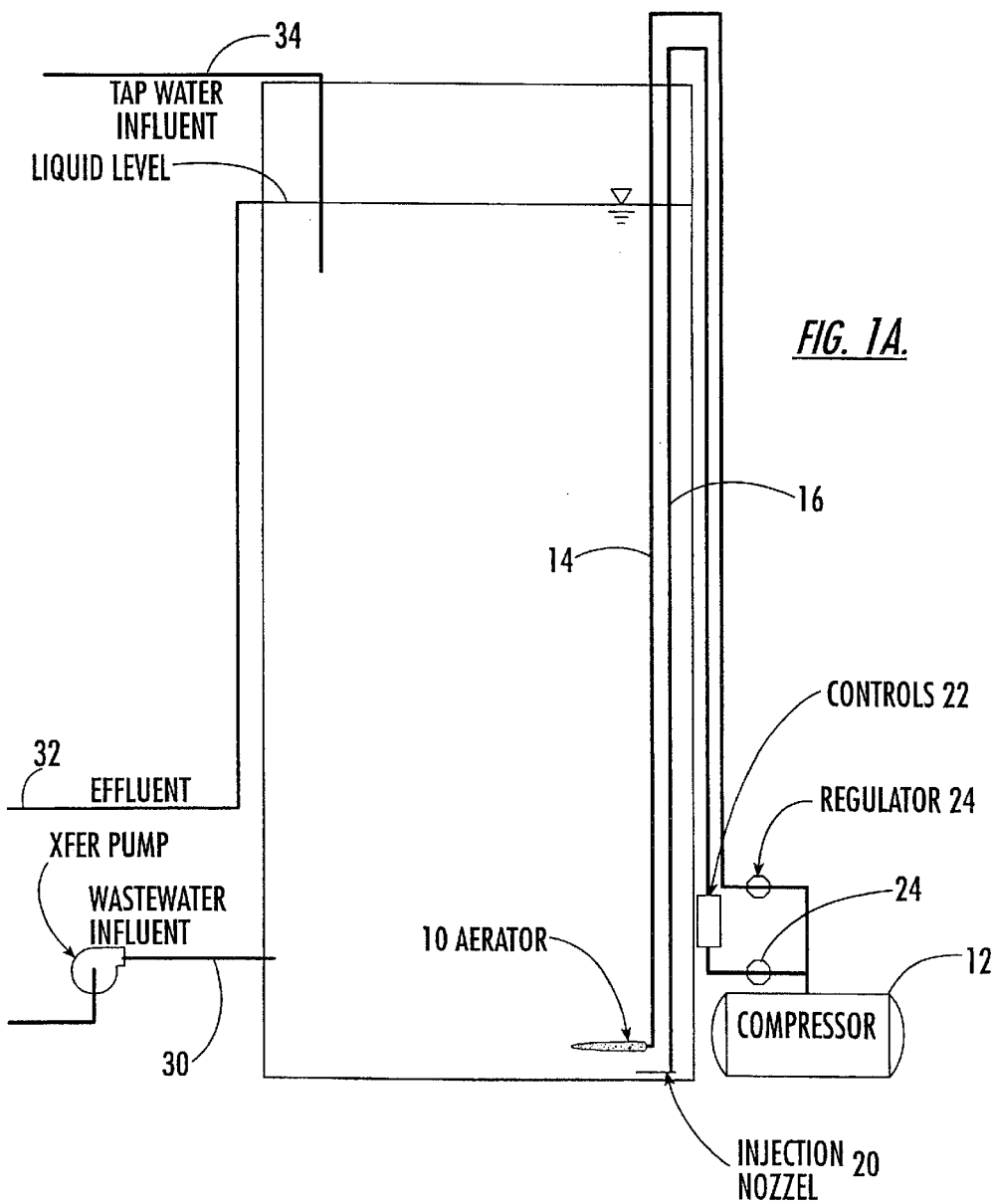
FIGS. 1A and 1B are schematic views of the process and apparatus used in accordance with the present invention.
Figure 1B:
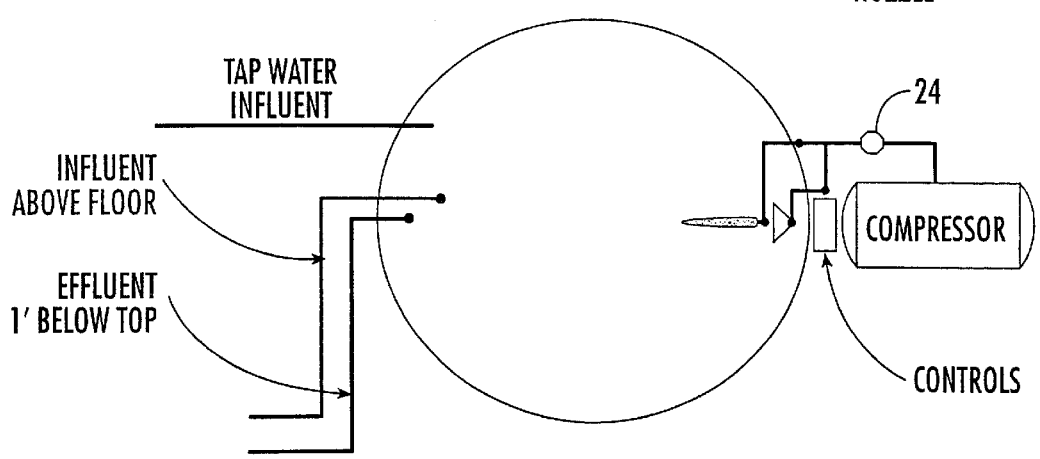
Figure 3:
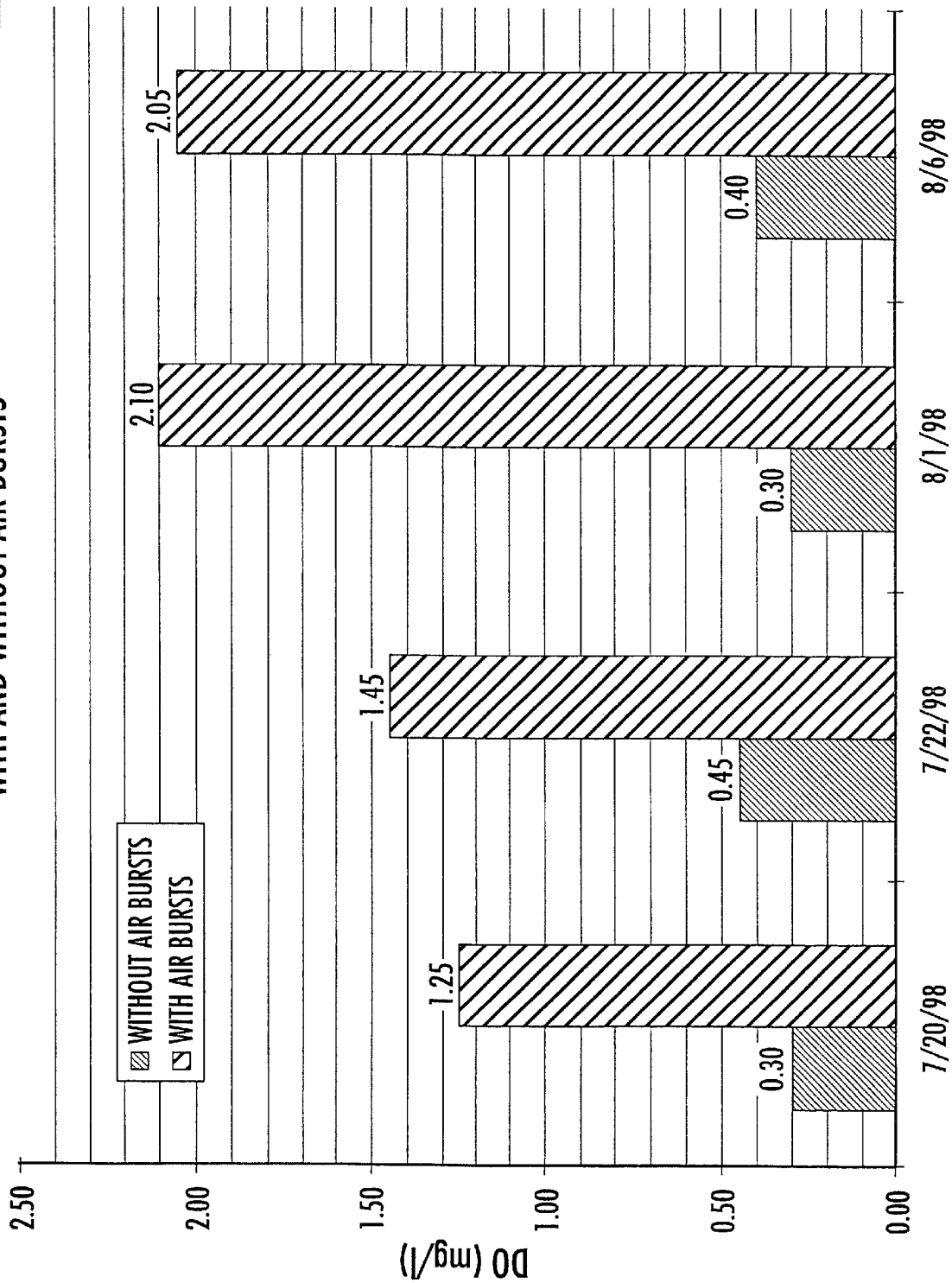

As seen in reference to FIG. 1A, the present process is described in reference to a cylindrical tank filled with a liquid such as waste water or sludge. An aerator 10 is positioned near the bottom of tank, the aerator responsive to conventional sources of a pressurized fluid such as compressed air. A compressor 12 provides a source of compressed air along feed line 14 which is in communication with aerator 10. Compressor 12 is in further communication along feed line 16 with an injection nozzle 20. A control unit 22 provides for a variable cycle to the intermittent burst of compressed air stream released through injection nozzle 20. Conventional regulators 24 are also used to control the desired pressure of the air/fluid delivered to the respective aerator and/or injection nozzle. Conventional waste water influent supply lines 30 and effluent drain lines 32 are provided as seen in FIGS. 1A and 1B.

The injection nozzle 20 is used to introduce cyclic, controlled bursts of compressed air or other fluid. The bursts of compressed air generate a plurality of bubbles up to several inches in diameter and which are typically larger than typically introduced in an aeration protocol. The large sized bubbles rise toward the surface of the liquid level creating a displacement of the adjacent fluid. The cumulative effect of the periodic release of bubbles is the generation of at least one circular pathway of liquid within the tank. As used herein, the term "circular pathway" indicates that near the surface of the liquid level there is a downwardly directed circulation pathway of the fluid. In this downwardly directed pathway, smaller air bubbles released from both the aerator 10 as well as those generated from the injection nozzle are entrained. As a result, the bubbles have an increased residence time within the tank, providing increased oxygenation of the tank liquid.

The periodic air releases (both time and volume) may be varied so as to achieve a desired circulation pathway. Initiating the next burst prior to the first burst reaching the surface works well in tank applications. However, both slower and more rapid air discharge cycles are envisioned with other application designs.

EXAMPLE 1

The equipment described in reference to FIGS. 1A and 1B was used to determine dissolved oxygen concentration in water. Both injection nozzle 20 and aerator 10 were run for several hours to achieve an equilibrium of dissolved oxygen concentration within the vessel. The sequence of air bursts is timed such that before the first release of air burst bubbles reach the liquid surface, a second burst is released. The height of the water column is approximately nine feet. Once an equilibrium is obtained, the injector nozzle 20 air mixer is then turned off while the aerator 10 continues to operate. Measurements were made every ten minutes following the cessation of the air injection mixer 20. The values are recorded in Table 1. Additional data is set forth in Table 2 which sets forth the percent increase of dissolved oxygen concentration in comparison to the percent increase of air volume, in CFM, needed to provide the additional aeration. In FIG. 2, the dissolved oxygen data set forth in Tables 1 and 2 is represented graphically.

As reflected above, the aeration as measured by dissolved oxygen is greatly increased by the timed bursts of air. The introduction of bursts of air serves to set in motion the entire mass of liquid from the bottom of the tank to the top in a recirculating manner. The circulation pattern provides a mechanism to increase the residence time of bubbles carried along the circulation pathway. When the burst aeration is stopped, there is an immediate and steady decrease in the dissolved oxygen content despite the presence of an ongoing air diffuser positioned within the bottom of the nine-foot tank.

EXAMPLE 2

An additional embodiment of the invention seen in reference to FIGS. 4A–4C and 5 is designed for use within an aeration basin of a waste water treatment plant. A typical waste water treatment plant uses an aerobic process having a plurality of conventional diffusers 40 positioned within the aeration basin. The diffusers 40 are arranged in a grid pattern on the floor of the basin, and air is supplied to the diffusers through a distribution system consisting of a blower (not shown) in communication to an interconnecting plenum 50. The plenum branches into a plurality of supply headers, some of which are arranged in parallel rows 52 along the floor of the basin as seen in reference to FIGS. 4A, 4B, and 5. The parallel supply headers 40 are in communication with conventional diffusers 40. Additional plenum branch lines 54 are in communication with injection nozzles 60 which are regulated to provide for the cyclic release of the intermittent air burst.

An aeration basin is a continuous flow process wherein raw influent enters an inlet into the basin and is channeled through gravity flow conditions until it exits the basin. While different shaped basins are known, the basic flow process remains the same. A typical aeration system conventionally used in an aeration basin is to provide a plurality of diffusers positioned near the tank bottom. Air, in the form of small bubbles, is released from the diffusers and rises through the water transferring oxygen from the bubble to the water. Microorganisms within the waste water then makes use of the oxygen in a biological process, thereby degrading organic material within the waste water.

Air bubbles rising from the diffusers causes some limited mixing of the liquid. However, the influence of the bubble on the surrounding water is limited and only produces an effect in the area immediately surrounding the diffuser.

The present invention uses additional injection nozzles 60 as indicated in FIGS. 4A–4C and 5 to introduce bursts of compressed air in an intermittent fashion. The timed air bursts provide a strong upwelling effect to the surrounding liquid to enhance the circulation pattern of the liquid. The increased flow velocity establishes flow patterns within the liquid and provides a greater residence time of the air bubbles, thereby increasing the dissolved oxygen content of the liquid.

Figure 4:
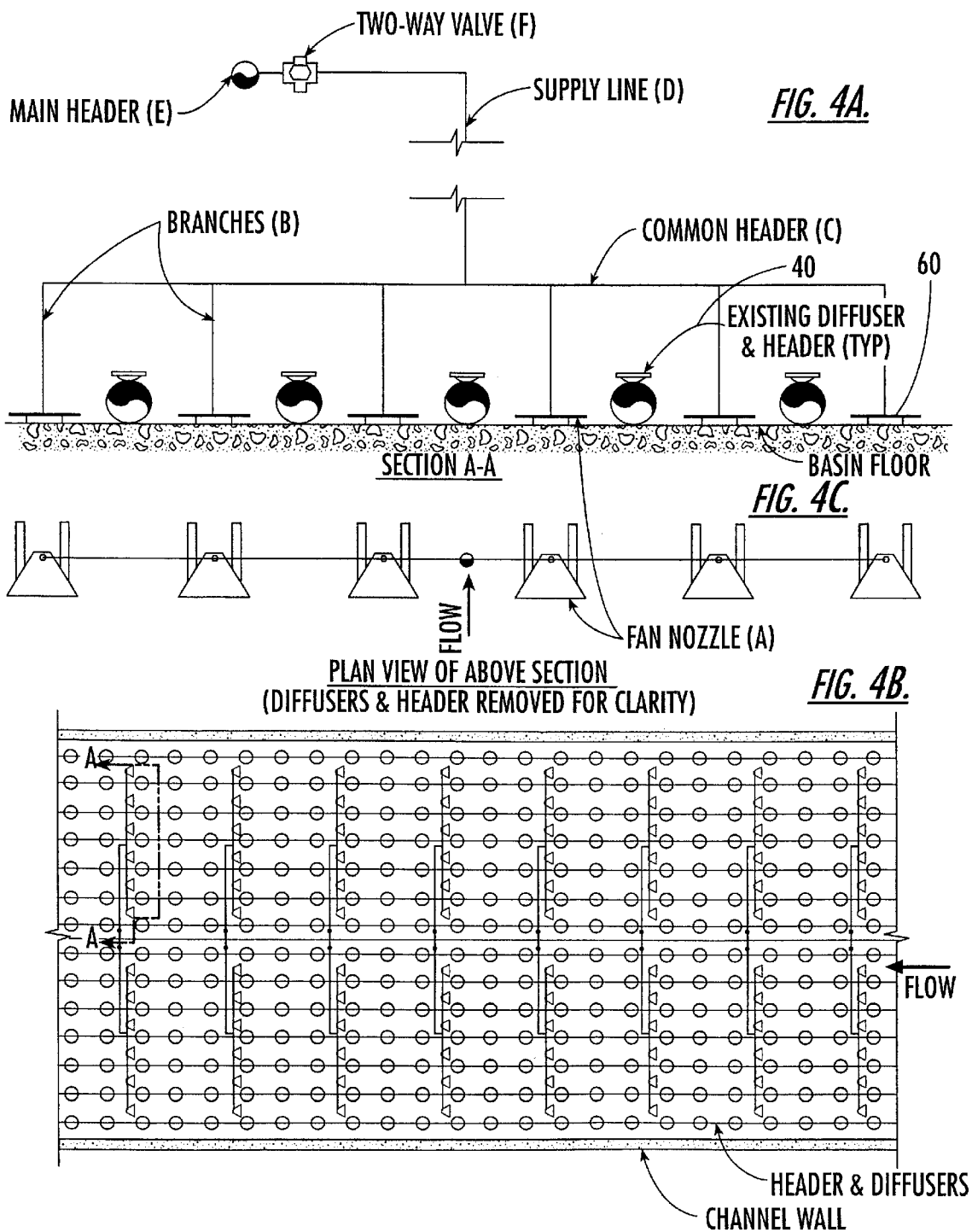
FIGS. 4A and 4B are schematic views of one embodiment of the process and apparatus for use in an aeration basin of a waste water treatment facility.
FIG. 4C is a top plan view of the injection fan nozzles as seen in reference to FIGS. 4A and 4B.
Figure 5:
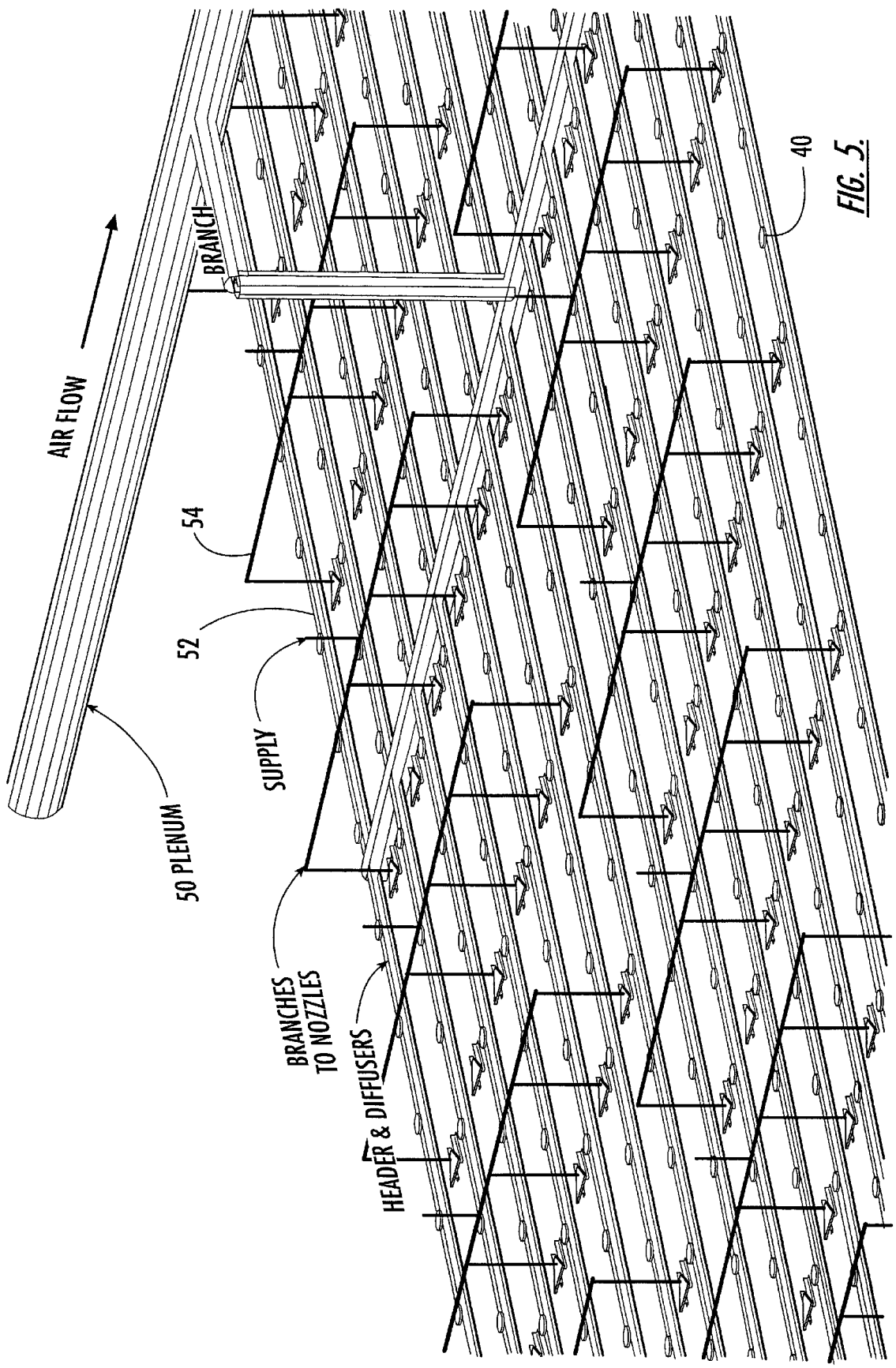
FIG. 5 is a schematic view setting forth additional details of the process and apparatus used in a basin of a waste water treatment facility.

As seen in reference to FIG. 4B, the current flow of the liquid is from right to left. The air injectors 60 can have directional housings 62 which can be rotated 360 degrees. Accordingly, it is possible to use the directional housing 62 to direct the injected air stream in any direction relative to the liquid gravity flow.

The air burst injection nozzle 60 and process of intermittent release of compressed air is compatible with numerous types of existing diffuser systems. For instance, an aerated treatment basin such as a typical activated sludge treatment basin, waste lagoon, or holding tank may be lined with air diffusers along its length. A typical basin has an average depth of 12–15 feet, though some basins are as much as 25 feet deep. Placement of the air burst mixing injectors at selected points within the basin can be used to achieve greater dissolved oxygen levels. The turbulent displacement also brings about increased mixing of the liquids.

While a typical treatment basin has a gravity induced directional flow of liquid, the flow rate and velocity is such that use of the air injection plates and the resulting discharge of air can establish localized circular currents and eddies within the liquid. The downwardly directed currents produced tend to further increase the residence time of small air bubbles caught within the current flow.

EXAMPLE 3

Figure 6:
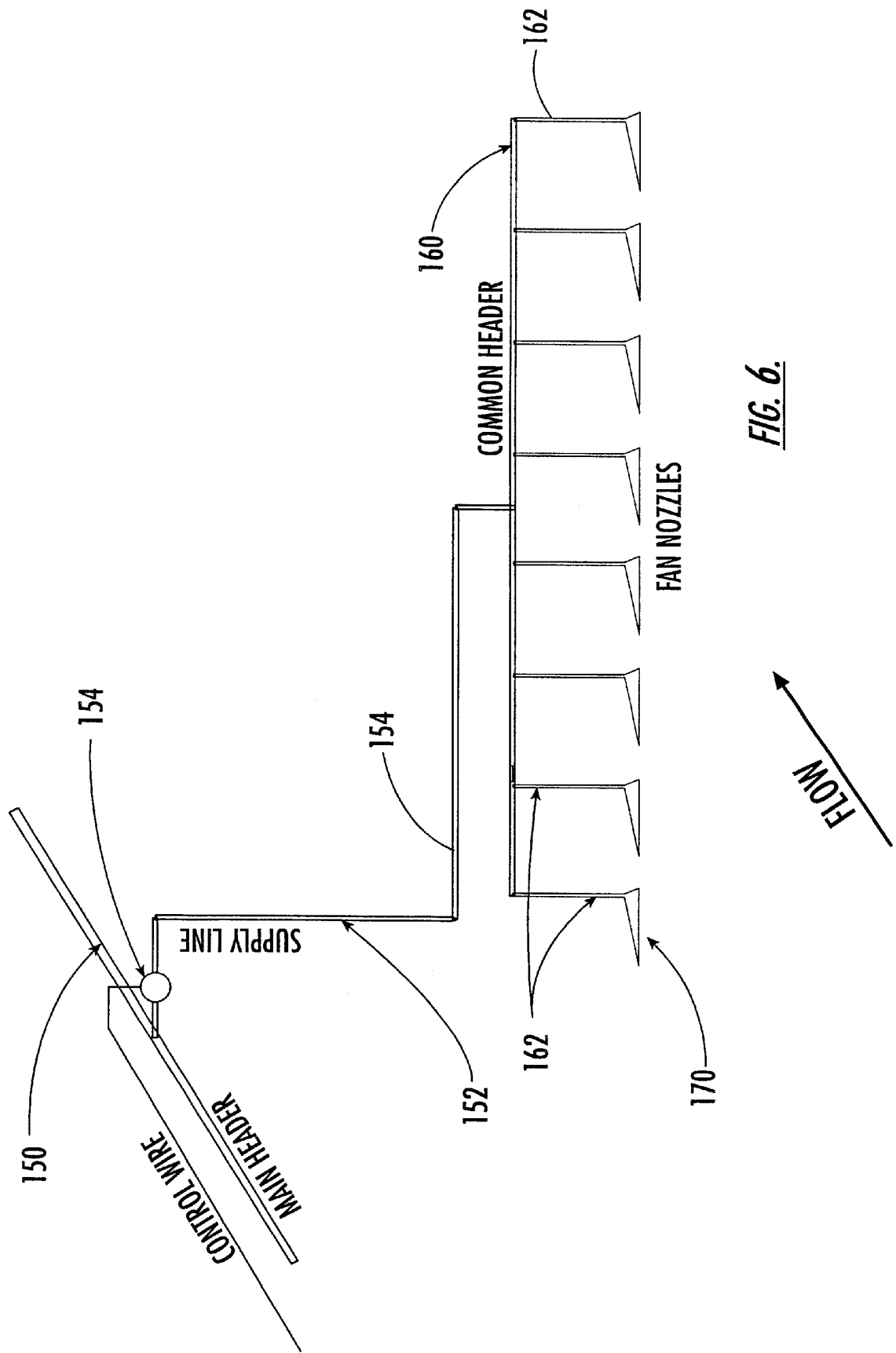
FIG. 6 is a schematic view of an apparatus useful in the waste water treatment of material housed within a confined container or body.

One embodiment as seen in FIG. 6 consists of a main header pipe 150 running the direction of the channel with smaller diameter supply lines 152 spaced at uniform intervals along the header pipe. Each supply line has a two-way valve 154 installed in line close to the header pipe. Piping 156 will then travel from supply lines 152 down into the basin and intersect into a horizontal header pipe 160. This common header 160 will drop additional lines 162 out for approximately equally spaced pipes of smaller diameter down to the tank bottom. Each line 162 will be connected to an injection nozzle 170. A system control device will actuate the two-way valve 154 in sequence such that an individual valve will be open for a fraction of a second at regular intervals, allowing a short but powerful burst of compressed air to be distributed to each of the variable direction nozzles 170. In one embodiment, the sequence of compressed air releases may be timed to move along the channel in the direction of liquid flow before returning to repeat the pattern. This wave-like effect can be varied as needed to achieve the desired maximum level of oxygenation of the liquid.

It is also possible to direct certain nozzles and establish a timing sequence which directs the turbulent burst of compressed air toward the basin wall, thereby establishing a localized circulation path within a portion of the basin. Other basins may make use of a serpentine pathway of various curves and corner flows. Again, the present process could be used to advantage at selected points along the pathway to produce localized areas of enhanced oxygenation and vertical liquid flow.

EXAMPLE 4

Figure 7:
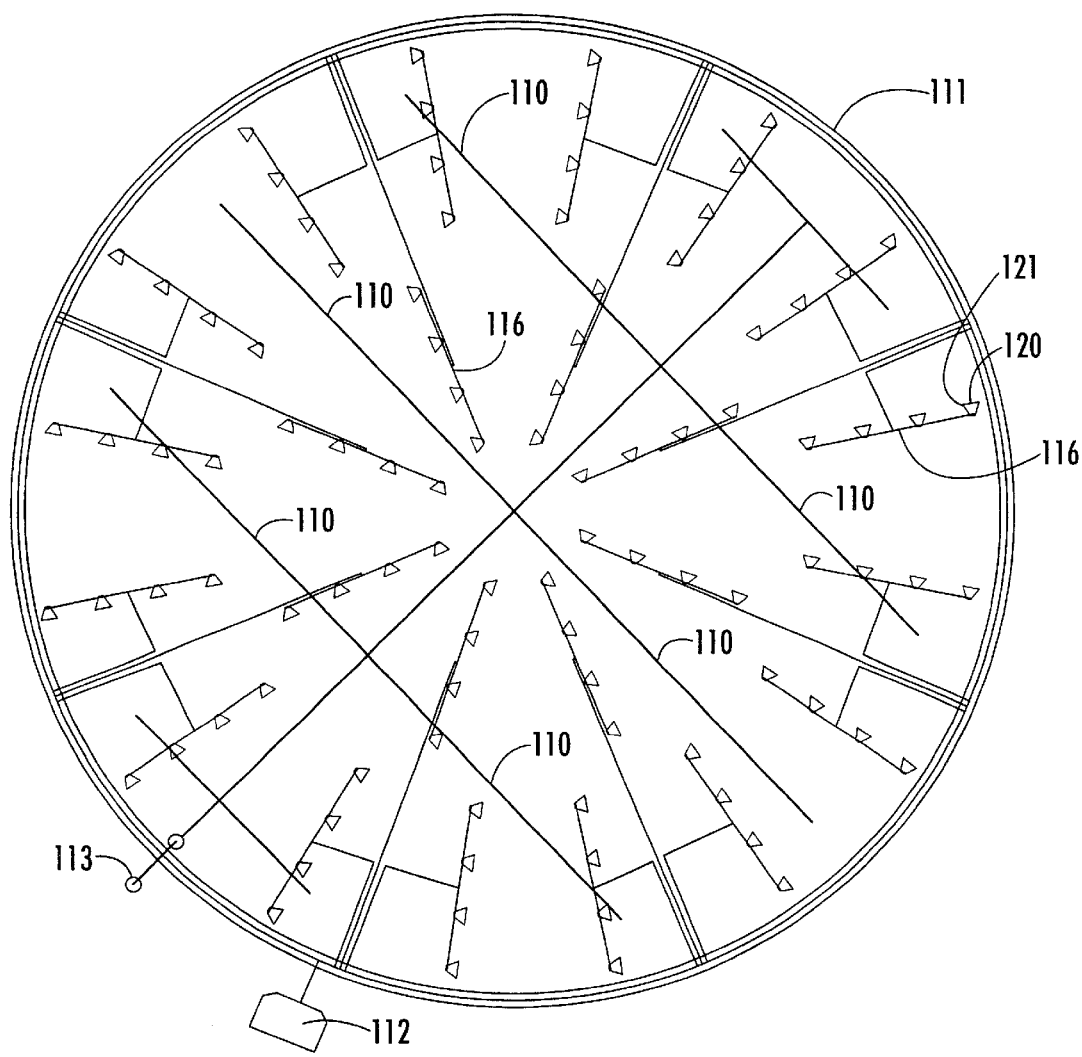
FIG. 7 is a schematic view of an embodiment of the present invention for use within a circular biosolid treatment tank.

Set forth in FIG. 7 is a schematic representation of an apparatus and process for treating biosolids housed within a container or impoundment. A series of coarse bubbled fusers 110 are set forth in a rectangular grid-like pattern within the bottom of a circular biosolid tank 111. A conventional blower 113 is used to bubble air through the diffusers 110. A radiating pattern of injectors 120 extend from a plurality of feed lines 116, each feed line in further communication with a source of pressurized gas, such as an air compressor 112. Each injector 120 further defines an adjustable, directional housing 121 which allows each burst from injector 120 to occur along a preselected direction. While not separately set forth in FIG. 7, the control units and regulators as discussed in reference to FIG. 1 are used to control the volume, timing, and sequence of intermittent air bursts from injector nozzles 120. As seen in reference to FIG. 7, the injectors 120 and housing 121 are oriented so as to establish a substantially counterclockwise direction of intermittent injected air. This arrangement allows a coordinated sequence of bursts from the plurality of injectors 120 so as to establish a circular flow within tank 111. The placement of the injectors 120 along the bottom of the tank facilitates the displacement and aeration of the denser solid materials within the tank and brings about an improved mixing and aeration.

The effectiveness of the injected air release in the examples described above is easily quantified by a variety of measurements. The determination of dissolved oxygen levels within various points of the waste stream will provide an indication as to the effectiveness of the number and timing cycles of the air burst injection releases. Further, conventional testing techniques of determining metabolic off gases and other measurements give an indication as to the metabolic activity of microorganisms within the liquid. All other factors being equal, an increased dissolved oxygen content will correlate with a more rapid and efficient treatment of organic material within the sludge.

It is appreciated by those having ordinary skill in the art that the present invention requires the introduction of additional air for injection. However, the increased efficiency brought about by higher dissolved oxygen content and enhanced circulation of the liquid more than offsets the additional cost associated with the air injection. As a result, an existing treatment facility may process a greater volume of liquid as a result of the increased efficiency. Further, implementation of the above process in a new facility may allow a large capacity of sewage treatment to be achieved in a smaller, and hence, less expensive facility.

It is also envisioned that the unique characteristics of enhanced circulation brought about by the injected release of air will lend itself to the construction of specially shaped and sized tanks which may further increase the efficiency of an aeration treatment within a waste treatment tank. For instance, the present process will enable the construction of taller tanks than are heretofore used. Conventionally sized tanks are limited to their current height and width by the difficulties of dispersing and mixing the waste water. The present invention addresses those limitations inherent in current processing techniques and would allow a taller tank to be successfully used in the treatment of liquid, facilitating the circulation patterns from the bottom to the top of the tank in conjunction with conventional diffuser apparatuses and technology.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

TABLE 1

| | Date of Test | | | |
|---|---|---|---|---|
| Time (min.) | 7/20/98 | 7/22/98 | 8/1/98 | 8/6/98 |
| 0 | 1.25 | 1.45 | 2.10 | 2.05 |
| 10 | 0.80 | 1.00 | 1.45 | 1.60 |
| 20 | 0.40 | 0.65 | 1.10 | 1.25 |
| 30 | 0.30 | 0.45 | 0.70 | 0.95 |
| 40 | | 0.40 | 0.45 | 0.85 |
| 50 | | 0.45 | 0.30 | 0.70 |
| 60 | | | | 0.55 |
| 70 | All values are in mg/l | | | 0.45 |
| 80 | | | | 0.40 |

TABLE 2

Air Useage

| Date | Without Air Bursts (mg/l) | With Air Bursts (mg/l) | % inc. | Air Flow without (cfm) | Air Flow with (cfm) | % inc. | % inc. per cfm |
|---|---|---|---|---|---|---|---|
| 7/20/98 | 0.30 | 1.25 | 417% | 3.54 | 6.31 | 178% | 234% |
| 7/22/98 | 0.45 | 1.45 | 322% | 3.54 | 6.31 | 178% | 181% |
| 8/1/98 | 0.30 | 2.10 | 700% | 2.73 | 5.66 | 207% | 338% |
| 8/6/98 | 0.40 | 2.05 | 513% | 4.45 | 6.61 | 149% | 345% |
| | | Average | 488% | | | Average | 274% |

That which is claimed is:

1. A process of treating waste water comprising:

providing a supply of waste water having a contained volume;

aerating the supply of waste water via a substantially continuous supply of released air into the water;

periodically releasing into the waste water a burst of compressed gas, the burst generating an upward displacement of the waste water and thereby establishing a current flow within substantially the entire contained volume of the waste water;

wherein, the current flow established within the waste water additionally increases the residence time of the supply of released air.

2. The process according to claim 1 wherein the contained volume further comprises a circular tank.

3. The process according to claim 1 wherein the contained volume further comprises a waste water basin.

4. The process according to claim 1 wherein the established current flow further defines a pathway, a portion of the pathway defined in proximity to a bottom portion of the contained volume.

5. The process according to claim 1 wherein the contained volume further comprises a pond or waste lagoon.

6. A process for treating a waste liquid comprising:

providing a continuous supply of aeration from a first source of released gas to a volume of waste liquid;

displacing a portion of the waste liquid with an intermittent burst of a second source of released gas, the intermittent burst establishing a current flow within the waste liquid volume, the current flow increasing the residence time of said first source of released gas entrained within the waste liquid.

7. A process of treating waste water comprising:

providing a confined volume of waste water;

providing a plurality of aerators within the confined volume of waste water;

providing a plurality of air injectors, each individual air injector having a directional nozzle and positioned along a bottom of the confined volume of waste water;

establishing a sequence of turbulent air bursts from the plurality of air injectors, the air bursts providing a displacement of waste water in the vicinity of the plurality of air injectors; and establishing a current flow through the waste water using the burst of air.

8. The process according to claim 6 wherein said step of providing a first source of released gas further comprises releasing air from a bubble diffuser.

9. The process according to claim 6 wherein said second source of released gas is released from a directional nozzle.

10. The process according to claim 6 wherein said second source of released gas is positioned below a release location of the first source of released air.

11. The process according to claim 6 wherein said intermittent burst includes releasing a plurality of bubbles having a diameter greater than 1 inch.

12. The process according to claim 6 wherein said displacing step further includes releasing a first intermittent burst of gas followed by a second burst of gas, said second burst of gas occurring before the said first burst of gas reaches a surface of the waste liquid.

13. The process according to claim 6 wherein said second source of released gas comprises air.

14. The process according to claim 6 wherein said displacing step further includes releasing a plurality of intermittent bursts of gas wherein a timing interval between each of said bursts is selected so as to create an effective amount of current flow within the waste liquid.

* * * * *